United States Patent [19]
Folk et al.

[11] Patent Number: 5,775,229
[45] Date of Patent: Jul. 7, 1998

[54] ON-BOARD GENERATOR SYSTEM

[75] Inventors: Kenneth Foster Folk; Frank Mario Mastrog, both of Harrisburg, Pa.

[73] Assignee: The Whitaker Corporation, Wilmington, Del.

[21] Appl. No.: 954,540

[22] Filed: Oct. 20, 1997

Related U.S. Application Data

[63] Continuation of Ser. No. 606,470, Mar. 4, 1996, abandoned.

[51] Int. Cl.$^6$ .................................................. B61F 5/50
[52] U.S. Cl. ..................... 105/157.1; 105/54; 105/96; 105/136; 310/75 R; 310/67 R; 290/3
[58] Field of Search ....................... 105/35, 54, 157.1, 105/182.1, 218.1, 96, 96.1, 136; 310/75 R, 67 R, 91; 290/3

[56] References Cited

U.S. PATENT DOCUMENTS

| | | | |
|---|---|---|---|
| 2,320,809 | 6/1943 | Wilson | 105/96.1 |
| 2,512,407 | 6/1950 | Wood | 310/75 R |
| 4,165,466 | 8/1979 | Strikkers | 290/3 |
| 4,377,975 | 3/1983 | Scott et al. | 105/96.1 |
| 4,539,497 | 9/1985 | Boyer | 310/75 R |
| 4,794,286 | 12/1988 | Taenzer | 310/12 |
| 4,974,797 | 12/1990 | Myers et al. | 246/169 |
| 5,057,727 | 10/1991 | Jones | 310/68 B |
| 5,111,138 | 5/1992 | Kramer | 324/174 |
| 5,127,747 | 7/1992 | Hilby et al. | 384/448 |
| 5,268,602 | 12/1993 | Schwaller | 310/67 A |
| 5,289,120 | 2/1994 | Moretti et al. | 324/174 |
| 5,416,372 | 5/1995 | Ljungstroem | 310/168 |
| 5,488,287 | 1/1996 | Kemner et al. | 322/20 |

FOREIGN PATENT DOCUMENTS

| | | |
|---|---|---|
| 0 449 538 A1 | 10/1991 | European Pat. Off. . |
| 0 518 456 A1 | 12/1992 | European Pat. Off. . |
| 15.74.979 | 7/1969 | France . |
| 2 263 517 | 10/1975 | France . |
| 2 624 818 | 6/1989 | France . |
| 25 51 009 | 5/1977 | Germany . |
| 2 254 154 A | 9/1992 | United Kingdom . |

OTHER PUBLICATIONS

F. B. Chaaban, et al., Topologies for a Permanent Magnet Generator/Speed Sensor for the ABS on Railway Freight Vehicles, date unknown, pp. 31–35.

Timken Quality Railroad Products, Progressive Railroading, Dec., 1994, Timken generates interest with new generator bearing, pp. 50–51.

*Primary Examiner*—S. Joseph Morano
*Attorney, Agent, or Firm*—Marshall E. Rosenberg

[57] ABSTRACT

Invention relates to an on-board electrical generator system that may be retrofitted to existing railroad vehicles, such as freight cars, box cars, and the like, where rotation of the vehicle's axle powers the system. A preferred use thereof is to charge the battery for the electrically controlled brakes on the vehicle. Such vehicles typically include a chassis, having plural axles mounted thereon, and a journal box or adaptor block having a projection generally aligned parallel with the axles. Each axle contains a pair of wheels, which are inwardly mounted from the respective axle ends and rotatable with the axle. The generator includes a rotor fixed for rotative movement relative to a stationary stator, whereby such relative movement causes electric currents to be generated in the stator containing the generator in a non-rotatable housing. The improved feature hereof is the provision of a hollow shaft for mounting of the rotor, where the shaft is slidably received on a respective axle end and keyed to the axle end. To secure the housing against rotation is an axially extending arm keyed to the projection. Another securing mechanism is an anti-rotation bar which cooperates with the journal box or adaptor block.

13 Claims, 7 Drawing Sheets

ON-BOARD GENERATOR SYSTEM

This application is a Continuation of Application Ser. No. 08/606,470 filed Mar. 4, 1996, now abandoned.

BACKGROUND OF THE INVENTION

This invention is directed to a generator system that can be retrofitted to existing railroad vehicles, such as freight cars, and the like, more particularly the invention relates to the housing or casing containing the generator, where such housing or casing is fixedly secured to the vehicle to allow relative rotation between the rotor and stator of the generator, and by the use of a hollow rotor shaft that is slidably received on the axle end of the railroad vehicle. The system hereof has particular utility as a generator for an on-board braking system, especially as a means for charging the battery for electrically controlled brakes on the vehicle.

On-board electrical generating systems for railroad freight vehicles, for example, have been known or examined for several years in Europe, such as for an anti-lock braking system (ABS), as exemplified by UK Patent Application No. 2254154A and European Patent Application No. 0449538A1. The former development is primarily directed to a system for detecting overheating of wheel bearings, particularly inboard bearings which cannot be detected by conventional lineside detectors. The system utilizes an electric power generator mounted on a stub shaft fixed to the wheel axle and held against rotation by a torsion rod fixed to the vehicle. While the preferred system incorporates a separate power coil to heat the generator casing to duplicate or match the temperature of the potentially overheated bearing, acknowledgment is made that other uses may be made of the system, without the separate power coil, where the sole purpose thereof is to generate electric power.

The latter European development is primarily directed to the disclosure of a three phase electrical generating system, which at relatively low rotational speed, generates peak open-circuit and peak full-load line voltages close to one another. The system thereof, illustrated in FIG. 1 of EPA 0 449538A1, includes a hollow cylindrical extension, closed at one end, fixedly mounted to a stationary housing, presumably the chassis of the railroad vehicle.

The present invention is unique in that the system hereof may be retrofitted to existing railroad vehicles with little or no modifications to accommodate same. The manner by which this may be accomplished is set forth in the following specification and accompany drawings.

SUMMARY OF THE INVENTION

The invention relates to an on-board electrical generator system that may be retrofitted to existing railroad vehicles, such as freight cars, box cars, and the like, where rotation of the vehicle's axle powers the system. A preferred use thereof is as a means to charge the battery for the electrically controlled brakes on the vehicle. Such vehicles typically include a chassis, having plural axles mounted thereon, and an adapter block having a projection generally aligned parallel with the axles. Each axle contains a pair of wheels, which are inwardly mounted from the respective axle ends and rotatable with the axle. The generator includes a rotor fixed for rotative movement relative to a stationary stator, whereby such relative movement causes electric currents to be generated in the stator containing the generator in a non-rotatable housing. The improved feature hereof is the provision of a hollow shaft for mounting of the rotor, where the shaft is slidably received on a respective axle end, and keyed to the axle end. Finally, a preferred means to secure the housing against rotation is an axially extending arm keyed to the projection.

BRIEF DESCRIPTION OF THE INVENTION

DETAILED DESCRIPTION OF PREFERRED EMBODIMENT

This invention is directed to an on-board generator system for mounting on the end of an axle of a railroad vehicle, such as a freight car, where such system is particularly suited for charging the battery of the vehicle's braking system through the rotation of the axle. Unlike prior systems, an advantage of the present invention is that it can be retrofitted to existing railroad vehicles with little or no modifications to the vehicle's wheel assembly.

Figure 1:
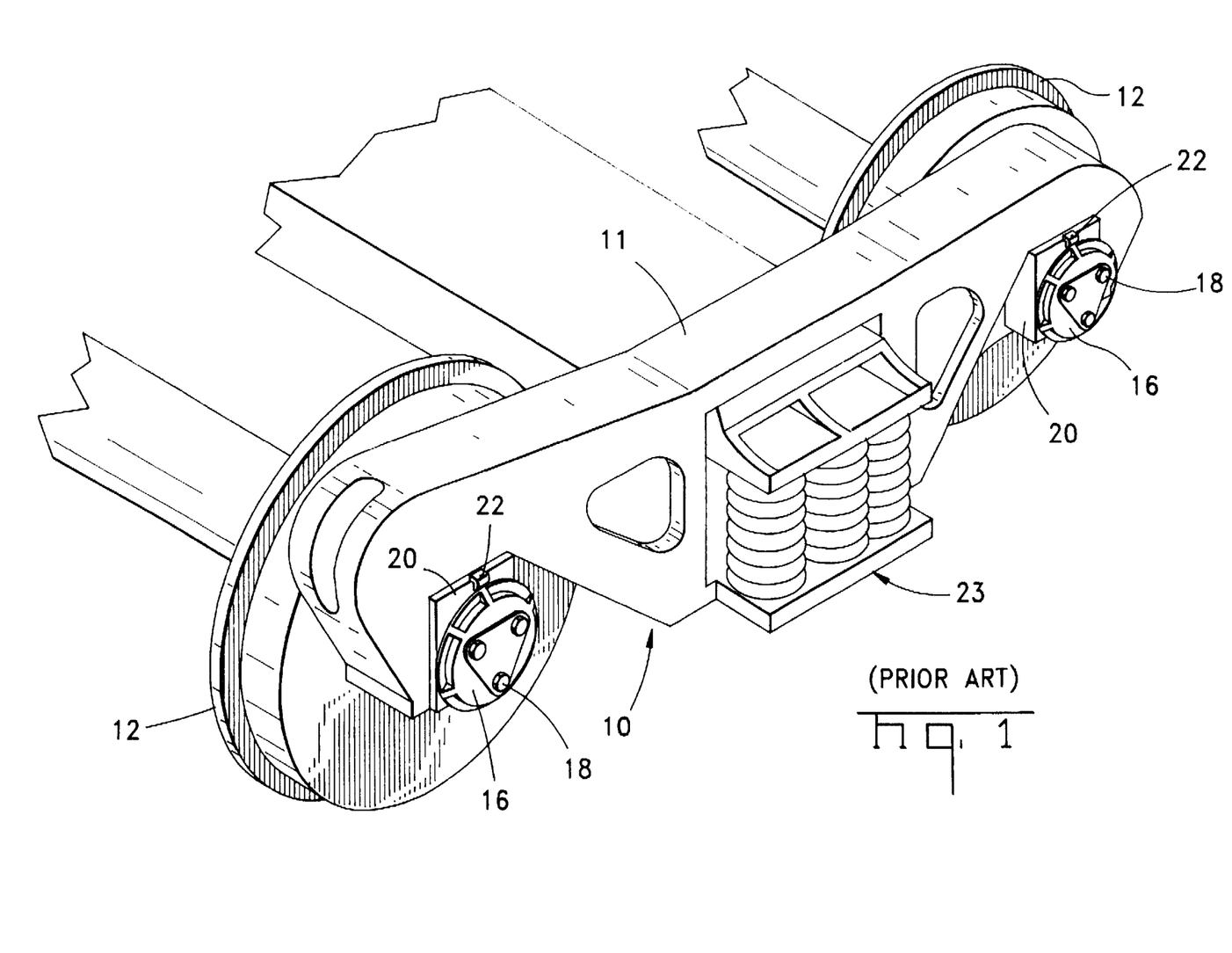
FIG. 1 is a partial perspective view of a typical wheel assembly or train truck, of a railroad vehicle, such as a freight car, to which the generator system of this invention may be retrofitted.

FIG. 1 illustrates the wheel and axle features of a typical railroad vehicle, where the wheel assembly 10 or truck thereof includes a frame 11, the ends of which are recessed to receive a pair of wheels 12 mounted for rotational movement about an axle, an outer bearing 14 having a bearing end cap 16 secured by three threaded members 18, and an adaptor 20 or journal box overriding the bearing 14. A feature of the adaptor 20 is the central projection 22, as known in the art, that projects outwardly in a direction essentially parallel to the axle to the assembly 10. Finally, intermediate the pair of wheels is the bolster assembly 23, the primary suspension system for the railroad vehicle.

Figure 2:
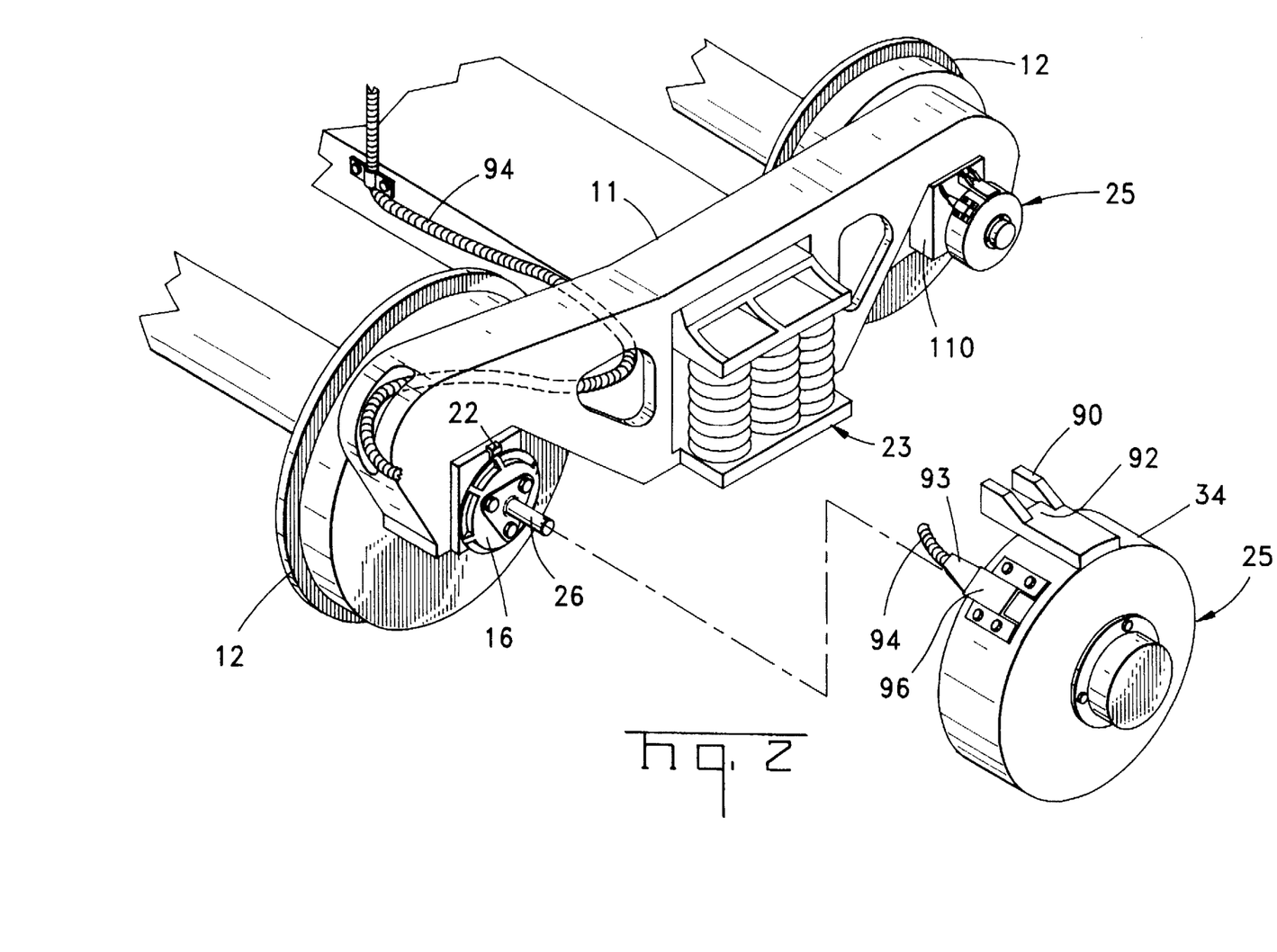
FIG. 2 is a partial, exploded view of a first embodiment of the generator system of this invention positioned for mounting and keying to the left axle of the wheel assembly of FIG. 1, and a mounted generator system to the right axle thereof.

FIG. 2, illustrates in an exploded fashion, a preferred embodiment of this invention, where the on-board generator system 25 is positioned for mounting to an axle end 26 or hub extending from the bearing end cap 16. For details of a preferred mounting procedure, see FIG. 3. The generator components, as known in the art, may comprise a rotor assembly 28, rotatable within a wound stator 29, where the rotor 28 is fixedly mounted to a cylindrical shaft 30, which shaft is dimensioned to be slidably received on the axle end 26. While a number of known generators may be incorporated herein, a generator suitable for practicing this invention is Model No. 953810, manufactured by Windstream Power Systems Inc., Burlington Vt.

Figure 3:
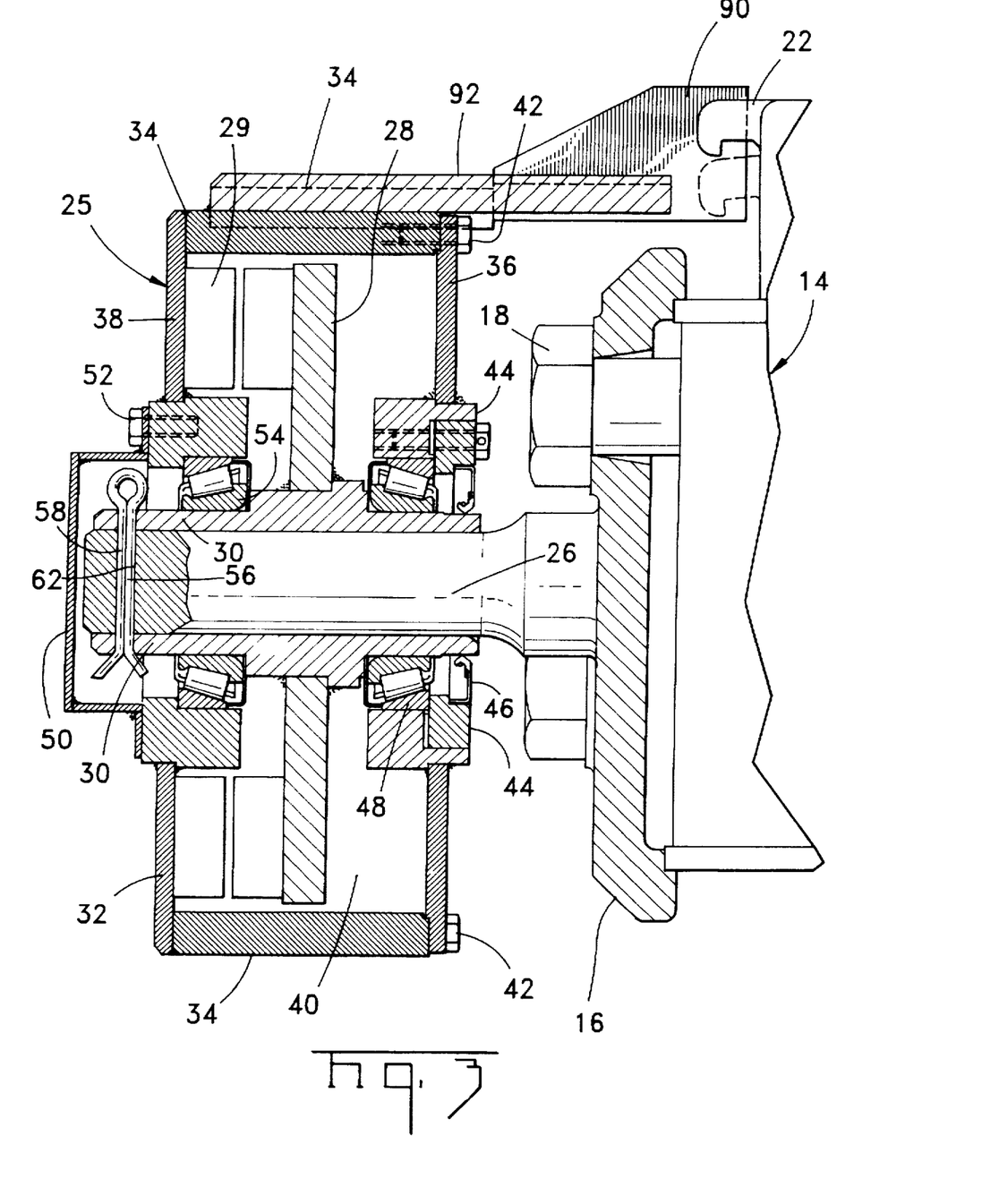
FIG. 3 is an axial sectional view, taken in part through the axle of the railroad vehicle, showing the generator system hereof mounted outside the bearing assembly of the wheel assembly.
Figure 4:
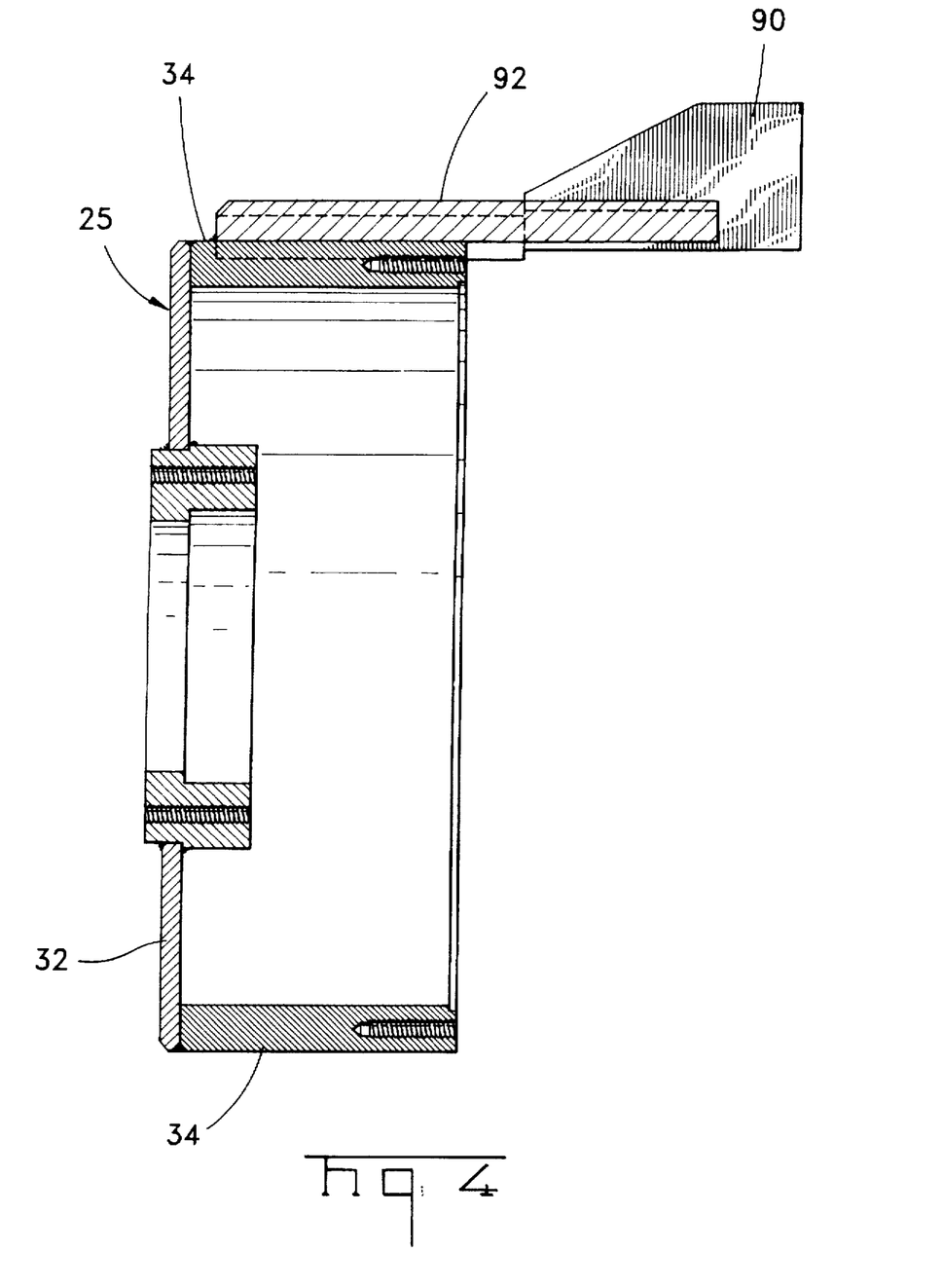
FIG. 4 is a sectional view of the generator housing.

The generator housing 32 may comprise a continuous or outer wall 34, inner and outer end plates 36, 38, respectively, secured thereto to define an annular chamber 40 within which lies the stator 29. As illustrated in FIGS. 3 and 4, the inner end plate 36 is removably mounted to the outer wall 34, such as by threaded members 42, for mounting the generator components therewithin. Since the inner end plate is stationary relative to the rotating rotor assembly 28, bearing retainers 44 and seals 46 may be provided to ensure protection for the inner bearings 48 and adequate relative movement within the system. Likewise, an outer end cap 50 may be secured to the outer end plate 38, by plural threaded members 52, to protect the outer bearings 54. Note also that such end cap 50 overrides and environmentally protects the mechanism by which the rotor assembly 28 is secured to the axle end 26. A preferred mechanism, as best seen in FIG. 3, utilizes a cotter pin 56, a well known fastening means, passed through holes 58 in the hollow rotor shaft 30, and aligned with a diametrical through hole 62 in the axle end 26.

Figure 5:
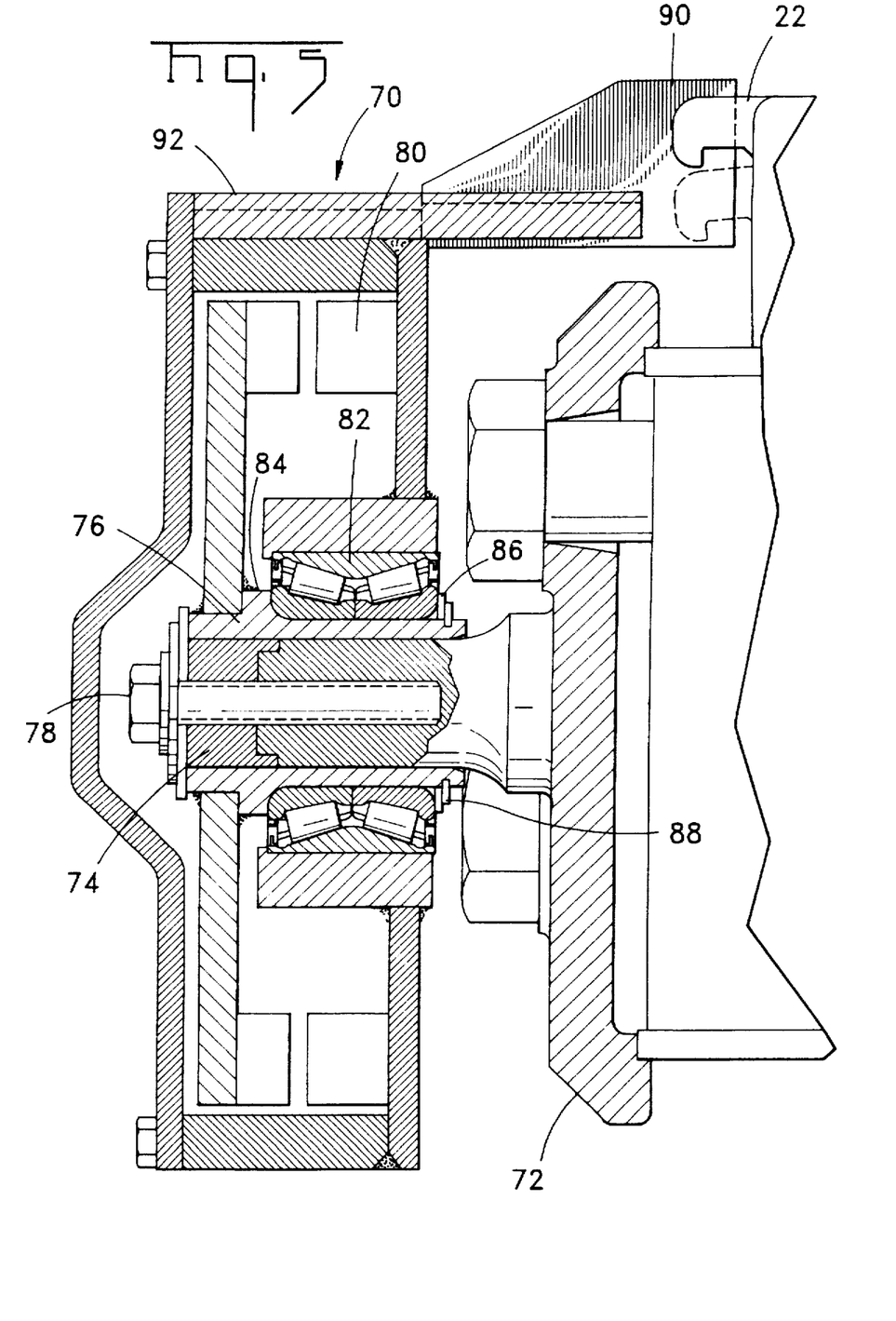
FIG. 5 is a sectional view, similar to FIG. 3, showing a further embodiment for the generator, as well as an alternate manner of securing the rotor of the generator to the axle extension.

One of the problems that may be associated with end-of-axle type generators is excessive weight or balance where the system could create a centrifugal effect through the motion and vibration of the system. FIG. 5 illustrates a generator system 70 that is mounted closer to the bearing cover 72, thereby requiring a shorter axle end 74 or hub. This reduces the moment that is created by the weight of the system. The system 70, depending in large measure on the design and weight distribution of the generator, and specifically its components, still employs a hollow rotor shaft 76. However, as an alternative shaft keying means, a locking bolt 78 may be used. In this embodiment, the stationary stator 80 includes inboard bearings assemblies 82, where such bearing assemblies are held for relative rotation about the rotor shaft 76 by a forward shoulder 84 and a rearward washer 86 and snap ring 88.

Figure 6:
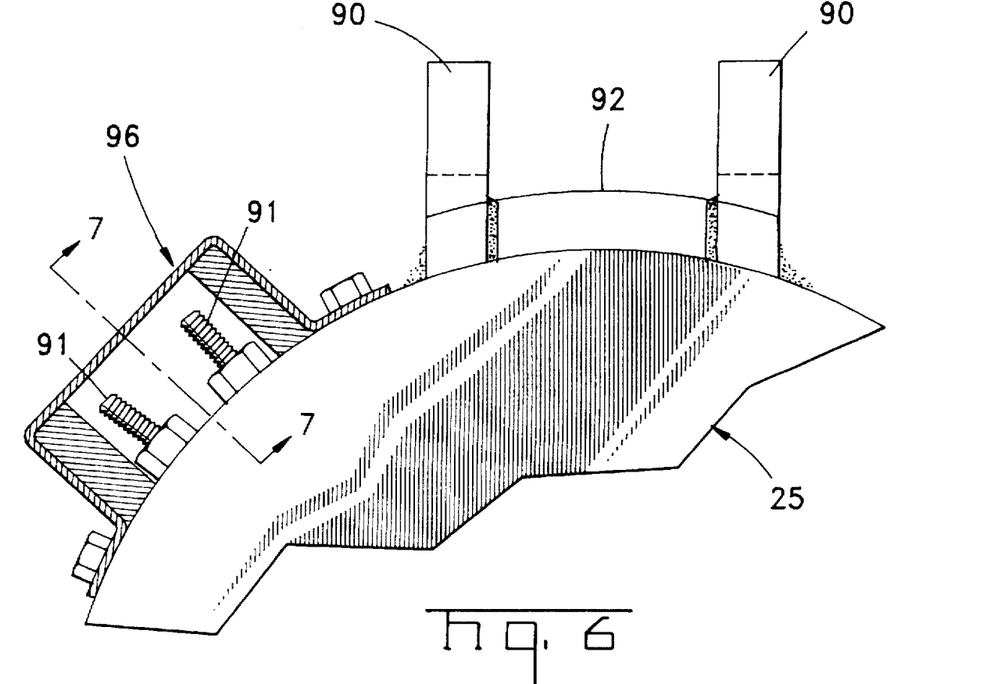
FIG. 6 is a sectional view illustrating the external electrical connections for the generator system hereof.

An obvious feature of any on-board, end-of-axle generator system, is a suitable means by which to fixedly secure the stator, for example, against rotations. In UK 154A, the patentees call for a torsion rod or arm fixed in some manner to the chassis of the vehicle. Unfortunately, this is an add on feature that cannot be retrofitted to existing railroad vehicles. In contrast, the generator system of the present invention includes means for engaging the existing design features of railroad vehicles to ensure operation of such system. Returning first to FIG. 1, a central projection 22, typically part of the adaptor 20, is aligned generally in the vertical plane of the axle. The generator system hereof, as best seen in FIGS. 2 and 6, preferably includes a pair of spaced apart ribs 90 extending inwardly from a base member 92 secured, such as by welding, to the outer generator wall 34. The spacing of the ribs 90 is such as to receive the central projection 22 therewithin. The projection 22, as best seen in FIGS. 3 and 5, is illustrated in two exemplary positions. There are, for example, several sizes of end caps 16, depending on vehicle load, designated 6×11 (class E), 6½×12 (class F), and 7×12 (class G), where the relative position of the projection 22 and adaptor 20 are spaced or shifted. Notwithstanding this shift, the ribs 90 are sized to accommodate the various sizes. In any case, by this arrangement, the outer generator wall 34 and the stator are held stationary, while the rotor is free to rotate under the action of the moving railroad vehicle. This relative movement of the rotor to the stator results in the generation of current to charge a battery, or for whatever use may be required.

Figure 7:
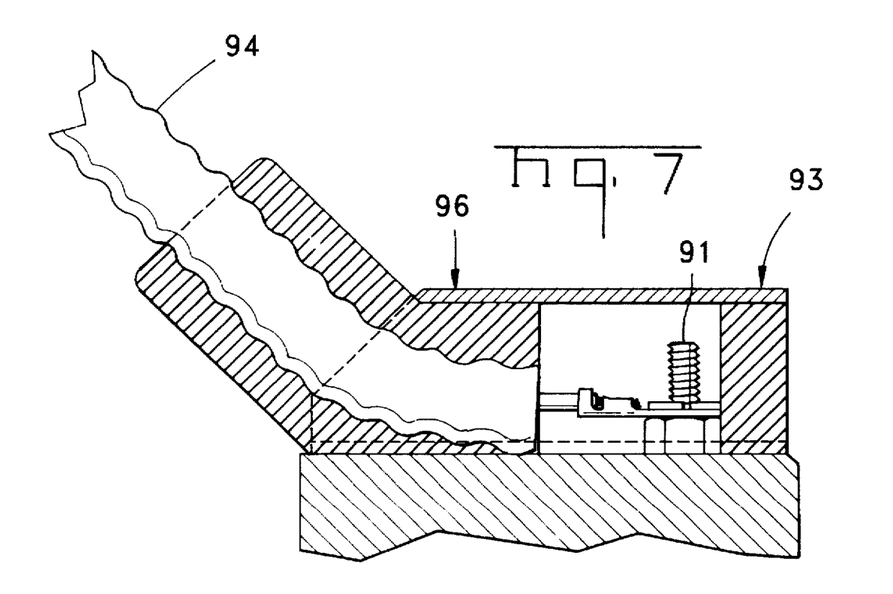
FIG. 7 is a sectional view taken along line 7—7 of FIG. 6.

To transmit the electrical current to the battery, for recharging for example, the outer wall 34 may be provided with a pair of contact posts 91 (FIGS. 6 and 7) mounting an electrical connector 93 having a transmission cable 94 extending therefrom, as known in the art. To help secure the connector 93 to the contact posts, a hold-down bracket 96 may be provided.

Figure 8:
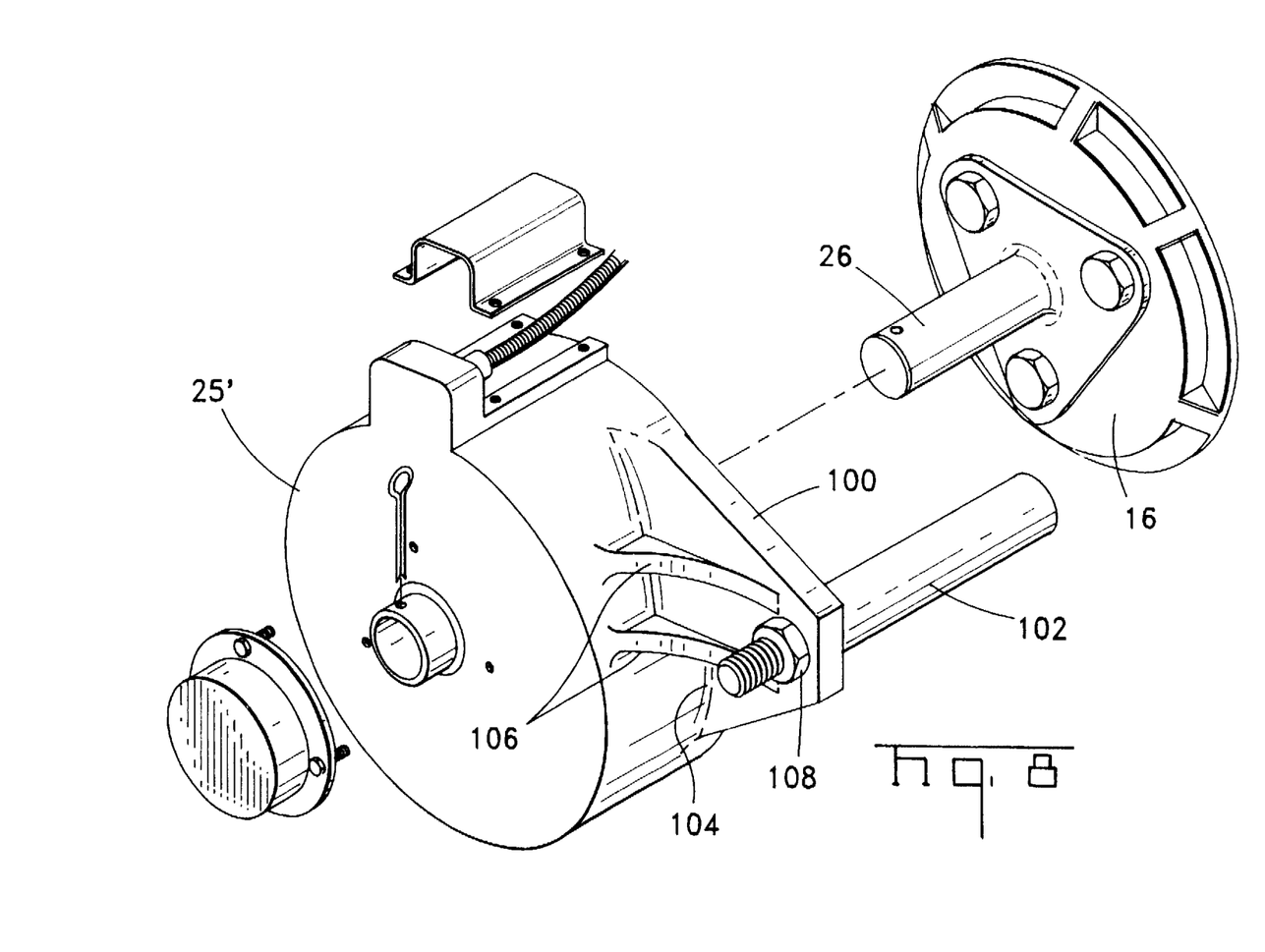
FIG. 8 is an alternative embodiment for the generator housing, illustrating in particular one or more anti-rotation bars that cooperate with existing truck to ensure operation of the system hereof.

FIG. 8 illustrates another retrofittable system for ensuring a stationary positioning of the generator housing 25'. Such system may, for example, include one or a pair of radially extending flanges 100 mounting an anti-rotation bar 102. The bar 102 is intended to abut or lie in close proximity to the adaptor 20, FIG. 1, where any rotation of the generator system 25 will be resisted by the adaptor 20.

In the embodiment of FIG. 8, the generator housing 25', which may preferably be a metal casting, such as aluminum, includes one, or a pair of flanges 100 or wings extending outwardly from the housing edge 104. The flange or flanges may include supporting rib(s) 106, with a complementary opening 108 to receive an anti-rotation bar 102, preferably a threaded steel rod. The bar 102 is positioned in close proximity to the outer side wall 110 of the adaptor journal box 20. The side wall 110 will thusly prevent rotation of the generator housing 25'.

We claim:

1. In an electrical generator system for mounting on a railroad vehicular axle which is mounted on a frame, where said axle includes a pair of wheels inwardly mounted from the respective axle ends and rotatable with said axle, said generator including a rotor fixed for rotative movement relative to a stationary stator, whereby such relative movement causes electric currents to be generated in the stator, and a non-rotatable housing to contain said generator, a hollow shaft for mounting of said rotor, where said shaft is slidably received on a respective axle end, and means to key said shaft to said axle end to ensure rotation of said shaft relative to said stator, an axially extending member extending from said housing which cooperates with said frame to maintain said housing stationary relative to said axle, wherein said axially extending member comprises a U-configured member having a pair of upstanding legs spaced apart to slidably receive a projection extending from said frame.

2. The electrical generator system according to claim 1, wherein said axially extending member is a metal rod extending parallel to said axle.

3. The electrical generator system according to claim 2 wherein said housing includes at least one radially extending flange mounting said metal rod.

4. The electrical generator system according to claim 1, including a pair of electrical connector posts and an electrical connector joined thereto for transmitting electrical current from said generator system.

5. In a railroad vehicle having a first axle mounted to a frame and a pair of wheels inwardly mounted to respective ends of said axle and rotatable with said axle, an electrical generator mounted to said vehicle comprising:
(1) a housing including an inner end plate and an outer end plate rigidly interconnected by a continuous outer wall, said housing arranged to remain rotationally stationary with respect to said frame;
(2) a second axle extending from and attached to one of said ends of said first axle for rotation therewith;
(3) a hollow shaft fixed to and rotatable with said second axle;

(4) a rotor plate attached to said hollow shaft for rotation therewith having walls extending radially outwardly between and substantially parallel to said inner and outer end plates;

(5) bearing means disposed between said hollow shaft and one of said inner and outer end plates for rotation of said hollow shaft with respect to said inner and outer end plates; and (6) an electrical stator winding secured to one of said inner and outer end plates and an electrical rotor winding secured to a said wall of said rotor plate in mating proximity to said stator winding for generating electricity upon said rotation of said first axle.

6. The vehicle according to claim 5 wherein said bearing means is disposed between said hollow shaft and only said inner end plate.

7. The vehicle according to claim 6 wherein said stator winding is secured to said inner end late.

8. The vehicle according to claim 5 wherein said bearing means is disposed between said hollow shaft and both said inner and outer end plates.

9. The vehicle according to claim 8 wherein said second axle extends through both said inner and outer end plates.

10. The vehicle according to claim 9 wherein said hollow shaft is fixed to said second axle by means of a pin disposed in a hole extending through both said hollow shaft and said second axle.

11. The vehicle according to claim 5 including an axially extending member attached to and extending from said housing which cooperates with said frame to maintain said housing stationary relative to said first axle, wherein said axially extending member comprises a U-configured member having a pair of upstanding legs spaced apart to slidably receive a projection extending from said frame.

12. The vehicle according to claim 11 wherein said axially extending member is a metal rod disposed parallel to said first axle.

13. The vehicle according to claim 12 wherein said metal rod is attached to said continuous outer wall of said housing.

* * * * *